United States Patent [19]
Allaire

[11] Patent Number: 5,873,565
[45] Date of Patent: Feb. 23, 1999

[54] ELASTIC SUPPORT FOR A VIBRATING MASS

[75] Inventor: Pierre Allaire, Chateaudun, France

[73] Assignee: Hutchinson, Paris, France

[21] Appl. No.: 670,824

[22] Filed: Jun. 20, 1996

[30] Foreign Application Priority Data

Jun. 21, 1995 [FR] France .................................. 95 07410

[51] Int. Cl.$^6$ .................................................. B60G 11/22
[52] U.S. Cl. ........................ 267/292; 267/293; 267/64.27
[58] Field of Search ..................... 267/292, 294, 267/136, 140.11, 141, 141.1, 141.4, 153; 188/378, 379; 180/300, 312, 902; 248/562, 566, 610, 634

[56] References Cited

U.S. PATENT DOCUMENTS

| | | | |
|---|---|---|---|
| 4,424,961 | 1/1984 | Takei .................................. | 188/379 X |
| 4,744,547 | 5/1988 | Hartel .................................. | 267/136 X |
| 5,156,380 | 10/1992 | Cerruti et al. ...................... | 188/378 X |

FOREIGN PATENT DOCUMENTS

| | | |
|---|---|---|
| 531766 | 3/1993 | European Pat. Off. ............... 188/379 |
| 2 431 639 | 2/1980 | France . |
| 26 10 212 | 9/1977 | Germany . |
| 28 07 160 | 8/1979 | Germany . |
| 3914250A1 | 10/1990 | Germany . |
| 402231208 | 9/1990 | Japan ................................ 267/140.13 |

OTHER PUBLICATIONS

Patent Abstracts Of Japan, vol. 007 No. 199 (M–240), Sep. 3, 1983 & JP–A–58 097525 (Nissan Jidosa KK) Jun. 10, 1993.
Patent Abstracts Of Japan, vol. 017 No. 555 (M–1492) Oct. 6. 1993 & JP–A–05 155263 (Bridgestone Corp), Jun. 22, 1993.
Patent Abstracts Of Japan, vol. 009 No. 117 (M–381), May. 22, 1985 & JP–A–60 004643 (Mitsubishi Jukogyo KK), Jan. 1, 1985.

*Primary Examiner*—Robert J. Oberleitner
*Assistant Examiner*—Melaine Torres
*Attorney, Agent, or Firm*—Evenson, McKeown, Edwards & Lenahan, PLLC

[57] ABSTRACT

An elastic support for a vibrating mass includes at least a first fixture, a second fixture and a block of elastic material bonded between the fixtures. The fixtures are capable of being subjected, as a result of excitation vibrations exerted on at least one of them, to relative vibrational displacements. At least one oscillator is fixed to one part of the block which is subjected to vibrations in phase opposition with those of one of the two fixtures. The "oscillator" function can be improved by incorporating a flexible circular comb in the block of elastic material, as well as by associating a decoupling slot in the block and a retaining ring preventing radial expansions of this block. The support is appropriate for fastening shock absorbers for vehicles.

8 Claims, 5 Drawing Sheets

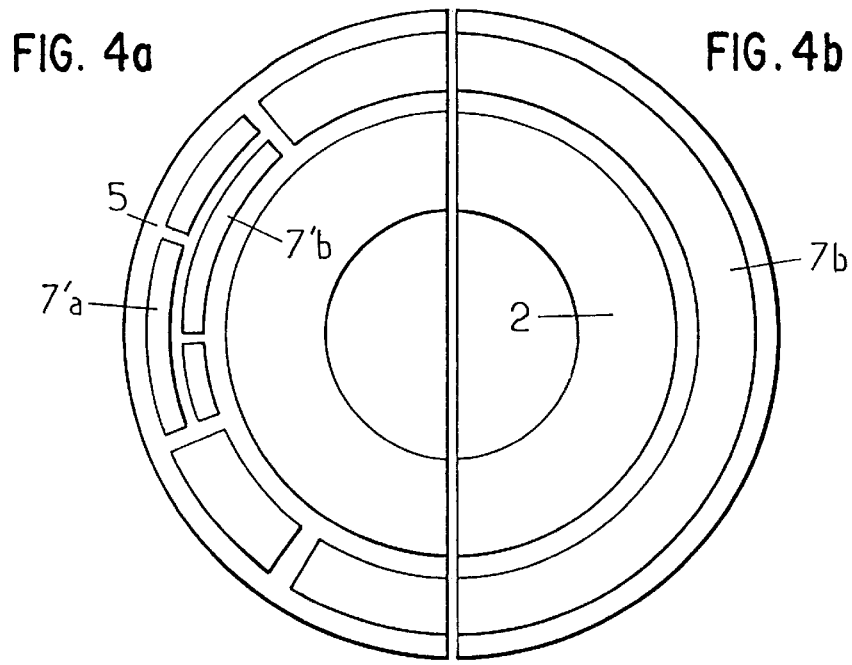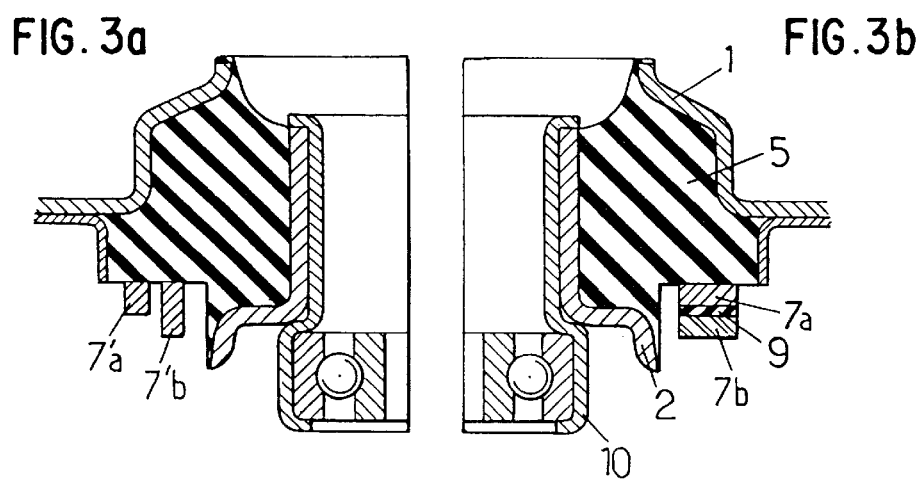

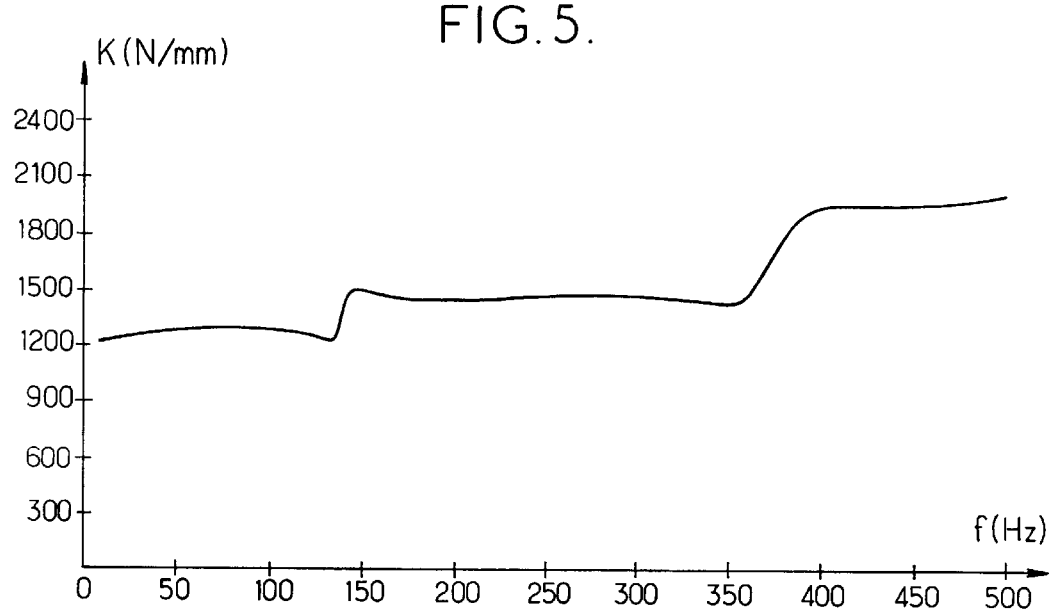

ELASTIC SUPPORT FOR A VIBRATING MASS

BACKGROUND OF THE INVENTION

1. Field of the Invention

The present invention relates to an elastic support for a vibrating mass, including at least a first fixture, a second fixture and a block of elastic material bonded between the fixtures, the latter being capable of being subjected, as a result of excitation vibrations exerted between them, to relative vibrational displacements.

The context of the invention may in particular, but not exclusively, relate to shock-absorbers or engine mounts.

2. Description of Related Art

Document FR-A-2,431,639 describes an elastic antivibration support with incorporated phase-shifter, but this system has the drawback that it increases the transmission of vibrations at low frequencies, while even causing a transmission peak at the resonant frequency.

SUMMARY OF THE INVENTION

The object of the present invention is to avoid this drawback inherent in phase-shifters and to attenuate, at least starting from low frequencies, the dynamic rigidification of such a support when the frequency of the vibrations rises, and to do this without resorting to a phase-shifter.

To this end, a support of the aforementioned type is, according to the present invention, characterized in that at least one oscillating mass or oscillator is fixed to one part of the block which is subjected to vibrations in phase opposition with those of one of the two fixtures.

The energy of the oscillator at resonance is therefore used for attenuating the dynamic rigidity of the block of elastic material when the fixtures are subjected to excitation vibrations. The fact that this oscillator is fixed on the most highly deformed part of this block will make it possible to obtain maximum effectiveness. At resonance, this function is therefore the opposite of that of a phase-shifter.

When the fixtures and the block of elastic material are annular and coaxial, the support may further be characterized in that the oscillator consists of a ring or ring portions coaxial with the said block, it being furthermore possible for this oscillator to be metallic and connected to the block of elastic material by an annular linkage made of the same material, optionally encasing the oscillator.

The expression "at least one oscillator" used above means that one or more oscillators can be used. In the case of a plurality of oscillators, they may be connected together in series or in parallel. This will make it possible to obtain attenuations of the dynamic rigidity of the block of elastic material at different frequencies.

These arrangements will be more clearly shown below.

The invention may furthermore be implemented in complementary fashion, by causing a lever effect inside the block of elastic material, in order to increase the effect of the oscillating mass in the part of the block which is subjected to vibrations in phase opposition with those of one of the two fixtures.

To this end, an elastic support according to the present invention may furthermore be characterized in that a flexible and elastic thin plate is incorporated in the block of elastic material, the plane of which plate extends perpendicularly to the direction of the axis of the forces exerted between the said fixtures, and which plate includes radial teeth extending on either side of a central ridge surrounding the axis.

This plate is therefore in the form of a double comb which is, for example, circular if the overall shape of the block of elastic material is cylindrical, as will be the case in general, this comb having inner radial teeth and outer radial teeth connected at their base by the ridge and capable of pivoting elastically on ridge, on either side of the plane of the said plate.

In this embodiment, the tilting of the radial teeth about the ridge may be promoted by providing this ridge with a bearing line over its entire length. This bearing line may, for example, be obtained by narrowing the axial thickness of the elastic material of the block where this line is located, in particular by providing a re-entrant part or groove, forming a pivot for the said ridge, on at least one of the said fixtures.

By virtue of these arrangements, it can be seen that the setting of a predetermined part of the block in phase opposition will be promoted, since, by tilting on its ridge, the radial teeth of the plate will transform internal deformations of the block of elastic material, in phase with the vibrations acting on one of the fixtures, into external deformations in phase opposition, at the relevant said part of the block.

BRIEF DESCRIPTION OF THE DRAWINGS

Embodiments of the invention, as well as other arrangements, intended in particular for reducing the energy density of the deformations in the block of elastic material, will now be described by way of nonlimiting examples, with reference to the figures of the appended drawing, in which:

FIGS. 3a and 3b represent variants with a plurality of oscillators, FIG. 3b on the right being with oscillators connected in series to the block of elastic material 5, and FIG. 3a on the left being with oscillators connected in parallel to the said block;

FIGS. 4a and 4b are corresponding underneath views, without a rolling-bearing cage of the variants of FIGS. 3a and 3b;

FIG. 5 shows the profile of the stiffness of the support as a function of frequency when two oscillators in series are used;

DESCRIPTION OF THE PREFERRED EMBODIMENTS

Figure 1:
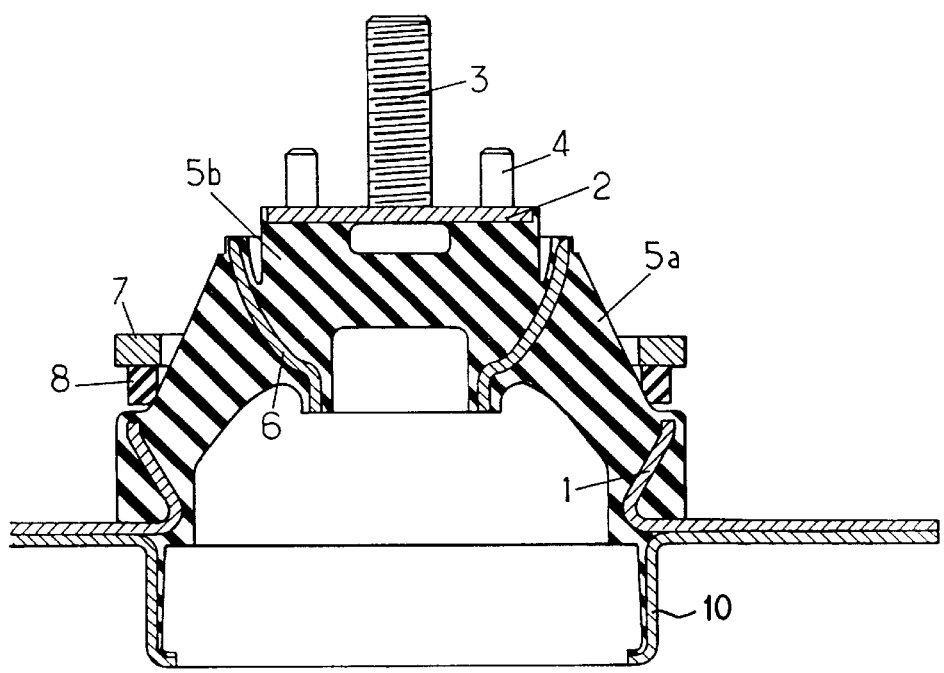
FIG. 1 is a view in axial section of an elastic support equipped with an oscillator according to the invention.

The support represented in FIG. 1 includes an annular outer fixture 1 made of sheet metal and a so-called inner fixture 2, here reduced to a circular plate which is coaxial with the fixture 1 and is provided with means 3, 4 for fastening to any vibrating mass (not represented), while the fixture 1 may itself be connected to a fixed part. A block of elastic material 5a, 5b, for example made of natural rubber, in the general shape of a cone which is also coaxial with the fixtures, is bonded onto the fixtures 1 and 2. In order to increase the static rigidity of this block, it may be divided into two parts by an approximately hemispherical dish 6, the parts 5*a* and 5*b* of the block of elastic material also being bonded onto the two opposite faces of this dish. A rolling-bearing cage 10 is fixed to the fixture 1.

Figure 2:
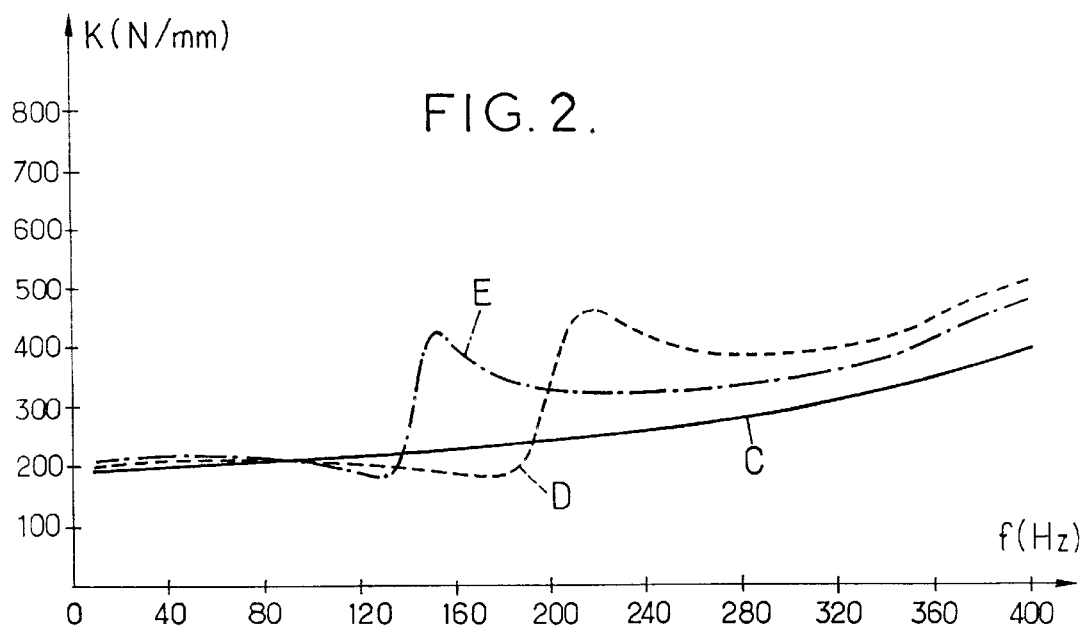
FIG. 2 is a graph showing the change in the stiffness of this support as a function of frequency, in comparison with that of a similar support which does not have an oscillator.

An elastic support constructed in this way, and known per se, has a stiffness K (in N/mm) which increases uniformly with frequency f (in Hz) along the curve C on the graph in FIG. 2.

In order to avoid this drawback, and in accordance with what has been indicated above, an oscillator 7 has been fixed on the block of elastic material 5*a*, 5*b*. This oscillator has been fixed to the least constrained part of this mass, the deformations of which are in phase opposition with the excitation vibrations exerted on the fixture 2, that is to say in phase with the compression vibrations exerted between the two rigid ends of the support. This location is here found to be situated not far from the base of the lower part 5*a* of the block of elastic material. In the example, the oscillator 7 has the form of a flat metal ring, for example made of steel, connected to the outer surface of the part 5*a* by an annular rubber linkage 8. This linkage could be moulded at the same time as the elastic block 5*a*, 5*b*, and in this case fully encase the oscillator 7.

With an oscillator with a mass m=250 g, the stiffness K changes according to the curve D on the graph; it is seen that it remains approximately constant up to about 180 Hz. With an oscillator with a mass m=600 g, the stiffness K changes according to the curve E on the graph; it is seen that it remains approximately constant up to about 130 Hz.

These measurements were taken under a load of 2000 N in a range of ±0.05 mm and from 0 to 400 Hz.

It should be noted that, as a variant, the oscillator 7 could be glued onto a rubber ring which provides a linkage with the block of elastic material.

The exact location of the linkage between this block and the oscillator may be determined by tests, but preferably by finite-element computation.

In the embodiments in FIGS. 3*a* and 3*b* in which the same references as in FIG. 1 have been used to denote the same parts of the support or parts fulfilling the same role, but with a rolling-bearing cage 10 fixed in the central fixture 2, FIG. 3*b* on the right represents the possible use of two oscillators 7*a* and 7*b* mounted in series, that is to say one mounted on the other with the interposition of an elastic element 9, these oscillators, optionally with different masses, and their intermediate element 9, having the shape of three superposed rings. The diagram in FIG. 5 can thus be obtained, on which it can be seen that attenuation of the dynamic rigidity at different frequencies is obtained, in this case towards 150 and towards 380 Hz.

It should be noted that, in the case of a plurality of superposed oscillators in series, they may be connected together by elastic elements 9 having identical or different rigidities.

The same type of result can be obtained with the embodiment represented in FIG. 3*a* on the left with oscillators 7'*a* and 7'*b* mounted in parallel, that is to say one around the other, it being again possible for these oscillators to have the shape of rings, or even ring portions, at least over a part of the periphery of the support.

In this case, the oscillators may be connected to the block of elastic material 5 by elastic elements which again have different or identical rigidities.

This embodiment, with the oscillators in parallel and being annular and coaxial with the block of elastic material 5, allows them to be linked to the block along a plurality of diameters on different circle portions, in the case when the block is asymmetric.

It should be noted that, in the embodiments in FIGS. 3*a* and 3*b*, the oscillators are fixed onto a part of the block 5 which is planar and perpendicular to the principal direction in which the vibrations are exerted, that is to say to the symmetry axis of the support. This embodiment is therefore more effective, from the point of view of attenuating the dynamic rigidity at certain frequencies, than the one in FIG. 1. This can be explained by the fact that, at this location, being almost entirely confined between the two fixtures 1, 2, the rubber of the block 5 is deformed in compression, and not in shear mode.

Finally, an attenuation of the radial dynamic rigidity, that is to say in the direction perpendicular to that of the vibrations, has been observed at certain frequencies in a support according to the invention.

Figure 6:
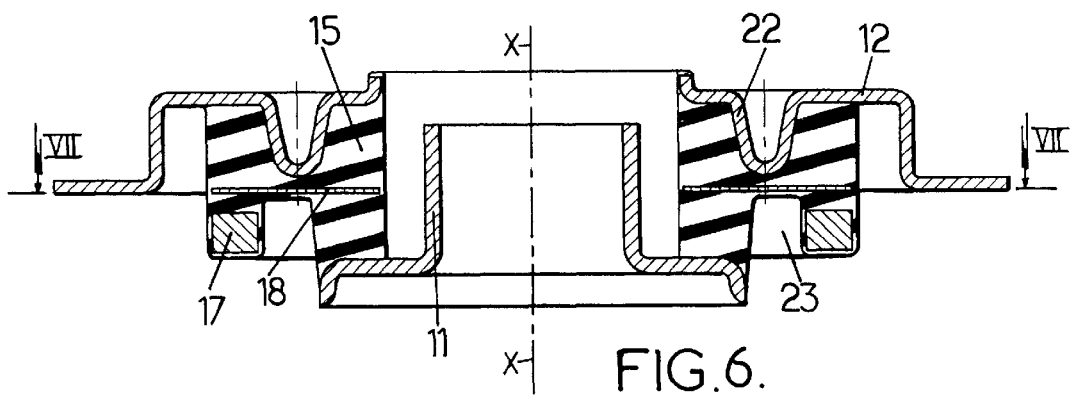
FIG. 6 is a view in axial section of an elastic support according to the invention, equipped complementarily with a thin plate with radial teeth which is included in the block of elastic material.
Figure 7:
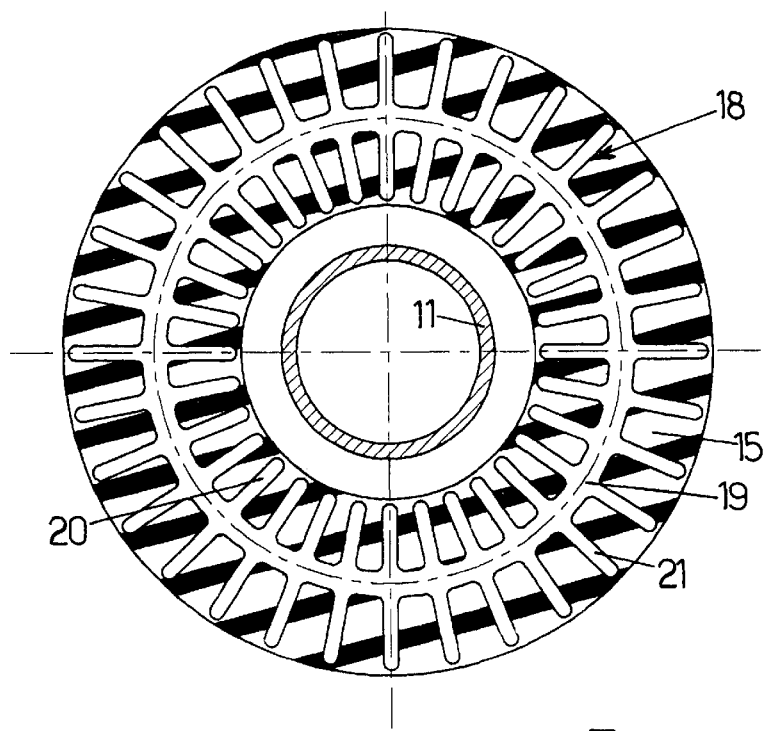
FIG. 7 is a plan view of this thin plate, long the line VII—VII in FIG. 6.

In the embodiment in FIGS. 6 and 7, it is possible to amplify the effect of the oscillating mass 17 in phase opposition with the principal vibrations acting on one of the fixtures 11, 12 by incorporating a thin elastic plate 18 in the block of elastic material 15, this plate being in the form of a circular comb surrounding the axis X-X of the forces acting between the fixtures. This plate has a peripheral ridge 19 from which inner 20 and outer 21 teeth extend radially. The function of this plate has already been explained above: it can be seen that axial vibrations acting at the end of the flexible inner teeth 20 will be transformed, by tilting about the ridge 19, into axial vibrations in phase opposition with the preceding ones, at the ends of the flexible outer teeth 21, which amplifies the action of the annular oscillator or oscillating mass 17. In order to promote this tilting, the stiffness of the elastic material 15 is increased at the ridge 19 by narrowing its axial thickness. This is performed easily by providing a stamped annular groove 22 in the upper fixture 12 in line with the ridge 19, with an opposite annular groove 23 in the block 15 further reducing its thickness at this point.

Figure 8:
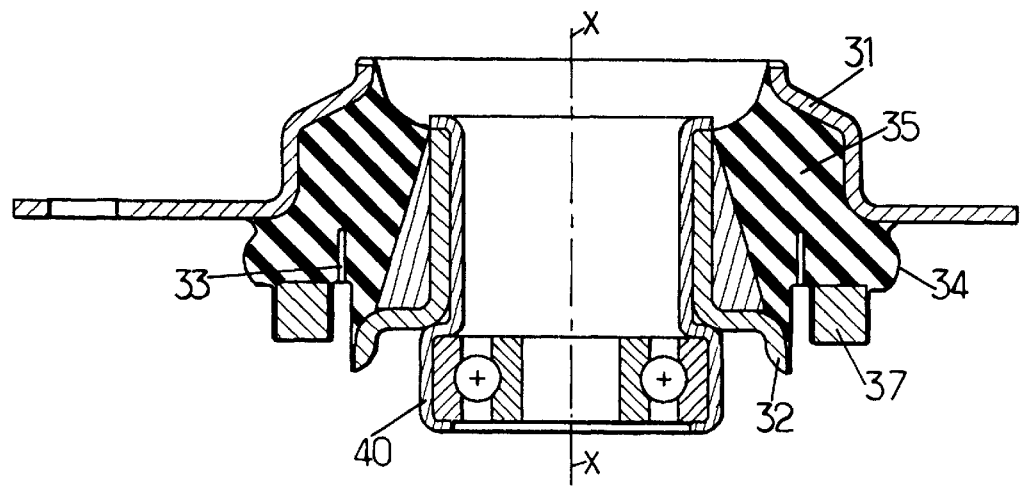
FIG. 8 is a view in axial section of an elastic support, also according to the invention, but comprising a variant.
Figure 9:
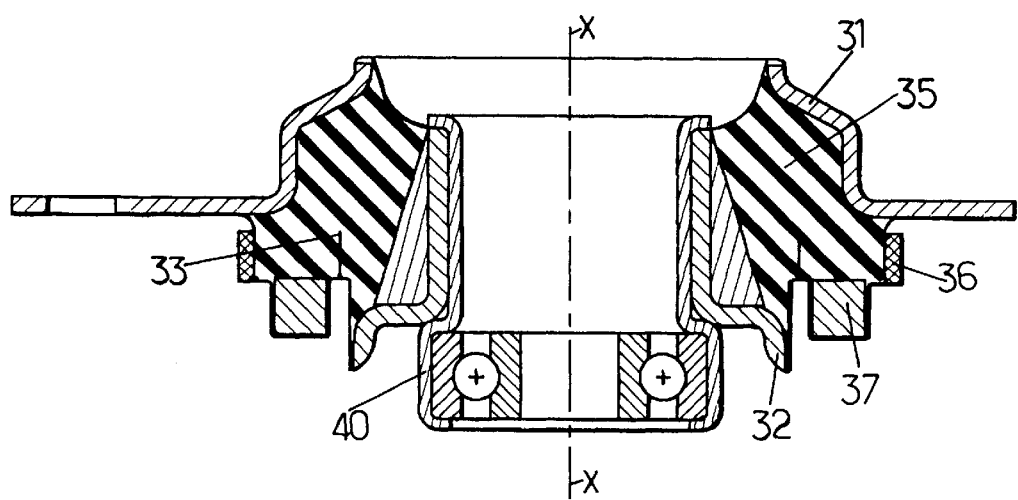
FIG. 9 is a similar view of this variant, with a complementary arrangement.

In the embodiments in FIGS. 8 and 9, in which the same references as in FIG. 3 have been adopted, but with 30 added to them, to denote the same parts of the support or parts which are similar or fulfil the same role. This support is represented under loading. A cylindrical decoupling slot 33 has been formed in the base of the elastic material 35 provided between the fixtures 31 and 32. This slot 33 is coaxial with the axis X—X and located on the inside relative to the oscillating mass 37. This arrangement makes it possible to reduce the internal stresses in the rubber or elastomer 35; in fact, this slot makes it possible to decouple the take-up of forces on the attachment from the "oscillator" function. A rolling-bearing cage 40 which is similar to the roller-bearing cage 10 of FIG. 3 is provided.

Since the rubber is incompressible, a radial expansion of its mass is observed (at 34 in FIG. 8), wherever it is not kept compressed by the fixtures, when it is subjected to axial forces. This swelling does not participate in the displacement of the oscillator. In order to prevent this effect and to convert this deformation into an axial one, the lateral part which is susceptible to this swelling is advantageously encircled by a retraining ring 36, as has been represented in FIG. 9, this ring being crimped after the mass 35 is moulded. This arrangement prevents radial swelling 34 while promoting the function of the oscillating mass 37.

Combining the decoupling slot 33 with the retaining ring 36 makes it possible to obtain a significant reduction (of the order of 40%) in the maximum deformation of energy density in the mass of elastic material 35, which reduces the fatigue of the rubber or synthetic material constituting the block 35.

I claim:

1. An elastic support for a vibrating mass comprising:

a fixed fixture, a movable fixture, said movable fixture being capable of being subjected, as a result of excitation vibrations exerted on it, to relative vibrational displacements, a block of elastic material bonded between said fixed and movable fixtures, and at least one oscillating mass, directly fixed to one part of said block, which is subjected to vibrations in phase opposition with those exerted on said movable fixture, wherein said at least one oscillating mass comprises two oscillating masses mounted in series on the block of elastic material, said oscillating masses having an elastic element interposed between them.

2. An elastic support according to claim 1, wherein the oscillating masses are annular.

3. An elastic support for a vibrating mass comprising:

a fixed fixture, a movable fixture, said movable fixture being capable of being subjected, as a result of excitation vibrations exerted on it, to relative vibrational displacements, a block of elastic material bonded between said fixed and movable fixtures, at least one oscillating mass, directly fixed to one part of said block, which is subjected to vibrations in phase opposition with those exerted on said movable fixture, and an annular linkage made of the same material as the block of elastic material, said annular linkage connecting the at least one oscillating mass to the block of elastic material.

4. An elastic support according to claim 3, wherein the annular linkage encases the at last one oscillating mass.

5. An elastic support for a vibrating mass comprising:

a fixed fixture, a movable fixture, said movable fixture being capable of being subjected, as a result of excitation vibrations exerted on it, to relative vibrational displacements, a block of elastic material bonded between said fixed and movable fixtures, at least one oscillating mass, fixed to one part of said block, which is subjected to vibrations in phase opposition with those exerted on said movable fixture, and a flexible and elastic thin plate incorporated in the block of elastic material, a plane along which the plate extends being perpendicular to a direction of an axis (X—X) of forces exerted between the fixed and movable fixtures, said plate including radial teeth extending on either side of a central ridge surrounding the axis.

6. An elastic support according to claim 5, wherein at least one of the fixtures includes, level with the central ridge, a groove narrowing an axial thickness of the elastic material and providing the plate with a bearing line promoting tilting between inner teeth of said radial teeth and outer teeth of said radial teeth.

7. An elastic support for a vibrating mass comprising:

a fixed fixture, a movable fixture, said movable fixture being capable of being subjected, as a result of excitation vibrations exerted on it, to relative vibrational displacements, a block of elastic material bonded between said fixed and movable fixtures, and at least one oscillating mass, fixed to one part of said block, which is subjected to vibrations in phase opposition with those exerted on said movable fixture, wherein said at least one oscillating mass is one of a plurality of oscillating masses, the oscillating masses being mounted mutually in parallel on the block of elastic material.

8. An elastic support for a vibrating mass comprising:

a fixed fixture, a movable fixture, said movable fixture being capable of being subjected, as a result of excitation vibrations exerted on it, to relative vibrational displacements, a block of elastic material bonded between said fixed and movable fixtures, and at least one oscillating mass, fixed to one part of said block, which is subjected to vibrations in phase opposition with those exerted on said movable fixture, wherein a cylindrical decoupling slot is formed in the block of elastic material radially inward relative to the at least one oscillating mass, said decoupling slot being associated with a retaining ring enclosing a lateral part of the block of elastic material which is not radially held by the fixed and movable fixtures.

* * * * *